United States Patent [19]

Blum

[11] Patent Number: 5,558,911

[45] Date of Patent: Sep. 24, 1996

[54] COATING ARTICLES USING RADIATION-CURABLE POWDER COATINGS

[75] Inventor: Rainer Blum, Ludwigshafen, Germany

[73] Assignee: BASF Lacke + Farben Aktiengesellschaft, Muenster, Germany

[21] Appl. No.: 422,861

[22] Filed: Apr. 17, 1995

[30] Foreign Application Priority Data

Apr. 18, 1994 [DE] Germany ................... 44 13 436.3

[51] Int. Cl.$^6$ .................................................... B05D 3/06
[52] U.S. Cl. ..................... 427/517; 427/518; 427/519; 427/520; 427/521
[58] Field of Search .................... 427/508, 517, 427/518, 519, 520, 521, 493

[56] References Cited

U.S. PATENT DOCUMENTS

| | | | |
|---|---|---|---|
| 3,919,347 | 11/1975 | Katsimbas | 260/836 |
| 3,926,639 | 12/1975 | Rosen et al. | 96/115 R |
| 3,974,303 | 8/1976 | Iwase et al. | 427/27 |
| 4,046,161 | 12/1977 | Lewis et al. | 526/320 |
| 4,129,488 | 12/1978 | McGinniss | 204/159.19 |
| 4,163,810 | 8/1979 | McGinniss | 427/54 |
| 5,073,611 | 12/1991 | Rehmer et al. | 526/208 |
| 5,128,386 | 7/1992 | Rehmer et al. | 522/35 |
| 5,223,645 | 6/1993 | Barwich et al. | 564/158 |
| 5,264,533 | 11/1993 | Rehmer et al. | 526/301 |

FOREIGN PATENT DOCUMENTS

| | | |
|---|---|---|
| 286594 | 10/1988 | European Pat. Off. . |
| 346734 | 12/1989 | European Pat. Off. . |
| 367054 | 5/1990 | European Pat. Off. . |
| 377199 | 7/1990 | European Pat. Off. . |
| 395990 | 11/1990 | European Pat. Off. . |
| 417564 | 3/1991 | European Pat. Off. . |
| 448741 | 10/1991 | European Pat. Off. . |
| 458164 | 11/1991 | European Pat. Off. . |
| 486897 | 5/1992 | European Pat. Off. . |

OTHER PUBLICATIONS

Powder Coatings, Chemistry and Technology, Misev, John Wiley and Sons, Chichester (1991).

*Primary Examiner*—Shrive Beck
*Assistant Examiner*—Erma Cameron
*Attorney, Agent, or Firm*—Keil & Weinkauf

[57] ABSTRACT

The invention relates to a method of coating articles with powder coatings which contain polymers and are applied to the surface of the substrate to be coated, are melted and are crosslinked by UV radiation, the polymers employed being copolymers of (a) at least one monomer of the general formula (I)

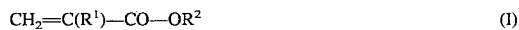

$$CH_2 = C(R^1) - CO - OR^2 \quad \text{(I)}$$

where
$R^1 = H$ or $CH_3$ and
$R^2 = H$, $C_nH_{2n+1}$ where n=from 1 to 30, or is an alicyclic, araliphatic or heterocyclic radical, hydroxyalkyl, alkoxyalkyl, glycidyl or aminoalkyl,
or of the general formula II

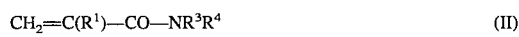

$$CH_2 = C(R^1) - CO - NR^3R^4 \quad \text{(II)}$$

where $R^3 = H$ or $CH_3$ and
where $R^3$ and $R^4$ may be identical to or different from one another and are H, $CH_2OH$, $C_nH_{2n+1}$ where n=1 to 30

(b) at least one copolymerizable, ethylenically unsaturated, organic compound which is different from (a) and (c) at least one copolymerizable, ethylenically unsaturated, aromatic or partially aromatic ketone which is capable of abstracting hydrogen in the excited triplet state.

13 Claims, No Drawings

COATING ARTICLES USING RADIATION-CURABLE POWDER COATINGS

The present invention relates to a method of coating articles with powder coatings which contain polymers and which are applied to the surface of the substrate to be coated, are melted and are crosslinked by UV radiation.

The term radiation-curable powder coatings generally refers to finely particulate, organic polymer powders which do not stick together during storage (ie. are blocking-resistant) are in general electrostatically chargeable and which can be applied by spraying to substrates in an electric field or are applied to the substrate to be coated by other methods, eg. by fluidized-bed sintering. On the substrates the powders are melted by heating to convert them into even coatings which are then crosslinked by a photochemically initiated reaction.

The powder coatings in use include both partially crosslinked coating materials and those which can be melted while exhibiting purely thermoplastic behavior. For applications requiring high degrees of weather resistance, scratch resistance, corrosion prevention, elasticity and gloss retention, for example in automotive finishing, only crosslinked systems are suitable; purely thermoplastic sintered powders are unable to satisfy these requirements. For crosslinking the powder coatings currently employed it is almost exclusively thermally initiated reactions of the polymeric film-forming binders with themselves or with an added crosslinking agent which are used. Examples of such thermally activated crosslinking reactions are the reaction of copolymerized epoxide groups with solid dicarboxylic acid anhydrides such as phthalic anhydride (cf. eg. U.S. Pat. No. 3,919,347) of or copolymerized hydroxyl groups with blocked isocyanates.

A main problem with powder coatings is their poor flow in comparison to liquid systems. This poorer flow comes about since it is not possible with thermally activated systems to make a clean division between the melting process and the crosslinking reaction; a crosslinking reaction resulting in an increase in viscosity occurs even during melting, so that the low viscosity which is desirable for optimum flow is not achieved. This problem cannot be solved by the use of polymers having a low melting point, since powder coatings produced from such polymers stick together during storage, ie. they do not have an adequate blocking resistance.

There have therefore been attempts to separate the melting process from the crosslinking reaction, by using a reaction which is not thermally activated for the crosslinking process. For this purpose, binders having mainly acrylic double bonds have been proposed in combination with photoinitiators. The intention is first to melt these mixtures at a sufficiently high temperature and then to carry out crosslinking by irradiation with UV light.

However, this method is also unable to separate the thermal crosslinking from the melting process to a sufficient extent, since the acrylic double bonds too are able to undergo thermal polymerization. Further problems result from the possibility of thermally initiated polymerization of the double bonds during preparation of the powders, for which it is generally necessary to employ melt processes.

Patent Applications EP-A-346,734, EP-A-367,054, EP-A-377,199, EP-A-395,990, EP-A-417,564, EP-A-448,741, EP-A-458,164 and EP-A-486,897 disclose specific aromatic ketones which can be used for the preparation of UV-crosslinkable adhesives, especially contact adhesives. These documents do not disclose the transfer of this principle to the separation of the melting and crosslinking processes with regard to powder coatings.

DE-A-24,36,186 describes the preparation of UV-crosslinkable powder coatings from polymers containing from 0.5 to 3.5 polymerizable C—C double bonds per 1000 molecular weight units. These polymers are converted to powders, mixed if desired with from 0.1% to 0.5% of photoinitiators, applied to the substrates to be coated, melted, and then crosslinked by the action of ionizing 30 or UV radiation.

However, this document does not mention hydrogen abstraction as a crosslinking principle.

U.S. Pat. No. 3,926,639 relates to polymeric compounds, derived from benzophenonecarboxylic acids, and substances having built-in photoinitiators. If double bonds are present these compounds are autophotopolymerizable or else can be employed as polymeric photoinitiators, for example with substances containing acrylic unsaturation such as pentaerythritol triacrylate. However, this document does not disclose hydrogen abstraction as a crosslinking principle, nor does it mention powder coatings.

U.S. Pat. No. 4,129,488 and U.S. Pat. No. 4,163,810 relate to UV-crosslinkable powder coatings which are based on ethylenically unsaturated polymers and which may contain photoinitiators, which may even be attached chemically to the polymers, the polymers having a specific block composition. These documents too contain no mention of hydrogen abstraction as a crosslinking principle for coating materials which are essentially free from double bonds.

EP-A-226,549 describes photostructured circuit boards which are produced in a special process using known UV-crosslinkable coating materials. Two classes of UV-crosslinkable polymers are mentioned: epoxy resins, which are polymerized cationically using UV-activatable initiators, and polymers containing ethylenic, preferably acrylic, unsaturation, which are polymerized using the UV initiators known for such systems. This document again contains no mention either of hydrogen abstraction as a crosslinking principle or of powder coatings whose crosslinking is based on this principle.

It is an object of the present invention to solve the above-mentioned problems of the known UV-curing powder coatings.

We have found that this object is achieved by the use of a crosslinking principle which cannot be activated thermally and which is based on the hydrogen-abstracting action of photochemically excited benzophenone derivatives.

The use of this principle in the context of UV-crosslinkable powder coatings, for the strict separation of the melting process from the crosslinking reaction, is novel and leads to surprising technical advantages.

The present invention relates to a method of coating articles with powder coatings which contain polymers, are applied to the surface of the substrate to be coated, are melted and are crosslinked by UV radiation, wherein the polymers employed are copolymers of (a) at least one monomer of the general formula (I)

$$CH_2=C(R^1)-CO-OR^2 \qquad (I)$$

where
R$^1$=H or CH$_3$ and
R$^2$=H, C$_n$H$_{2n+1}$ where n=from 1 to 30, or is an alicyclic, araliphatic or heterocyclic radical, hydroxyalkyl, alkoxyalkyl, glycidyl or aminoalkyl,
or of the general formula II $$CH_2=C(R^1)-CO-NR^3R^4 \qquad (II)$$

where R$^1$=H or CH$_3$ and
where R$^3$ and R$^4$ may be identical to or different from one another and are H, CH$_2$OH, C$_n$H$_{2n+1}$ where n=1 to 30 or CH$_2$OR$^5$ where R$^5$=C$_m$H$_{2m+1}$ where m=1 to 12, (b) at least one copolymerizable, ethylenically unsaturated, organic compound which is different from (a) and (c) at least one copolymerizable, ethylenically unsaturated, aromatic or partially aromatic ketone which is capable of abstracting hydrogen in the excited triplet state.

The copolymers preferred in this context have glass transition temperatures of from −10° C. to 140° C.

The method of the invention especially prefers copolymers wherein component (a), incorporated by polymerization, comprises alkyl acrylates or alkyl methacrylates having from 1 to 10 carbon atoms in the alkyl radical, or mixtures thereof with glycidyl (meth)acrylate and/or (meth)acrylic acid, and also those where component (b), likewise incorporated by polymerization, comprises styrene, 4-tert-butylstyrene and/or 1-methylstyrene.

Component (c) is preferably incorporated by polymerization in a quantity of from 10 to 50 % by weight, based on the total quantity of components (a), (b) and (c). A preferred embodiment of the method of the invention is one in which the copolymers have been prepared by the method of thin-film polymerization in bulk or in the presence of solvents and removal of the solvent by conventional methods.

The copolymers can be prepared in the presence of solvent and free-radical polymerization initiators and the solvent can be removed by conventional methods.

The powder coatings to be employed in accordance with the invention can be applied to the surface of the substrate to be coated by electrostatic spraying, by fluidized-bed sintering or by another method which is conventional for the processing of powder coatings, and once applied they can be melted by heating and, after having formed a coating which has flowed out evenly but is still liquid, can be crosslinked by UV radiation. UV irradiation can also be carried out after partial or complete cooling of the previously melted coatings.

Before being processed further to give powder coatings, the copolymers can also be mixed with solid, ethylenically unsaturated, monomeric, oligomeric or polymeric substances in a ratio of from 90:10 to 10:90.

The copolymers may also contain double bonds or may contain, in addition to the intrinsic UV photoinitiators (c) incorporated by polymerization, other conventional UV photoinitiators alone or in addition to conventional UV stabilizers.

Further details of the structural components of the copolymers to be employed in the method according to the invention are given below.

The copolymers to be used in accordance with the invention contain, in copolymerized form, as component (a) at least one monomer of the general formula (I)

$$CH_2=C(R^1)-CO-OR^2 \qquad (I)$$

where
R$^1$=H or CH$_3$ and
R$^2$=H, C$_n$H$_{2n+1}$ where n=from 1 to 30, or is an alicyclic, araliphatic or heterocyclic radical, hydroxyalkyl, alkoxyalkyl, glycidyl or aminoalkyl,
or of the general formula II $$CH_2=C(R^1)-CO-NR^3R^4 \qquad (II)$$

where R$^1$=H or CH$_3$ and
where R$^3$ and R$^4$ may be identical to or different from one another and are H, CH$_2$OH, C$_n$H$_{2n+1}$ where n=1 to 30 or CH$_2$OR$^5$ where R$^5$=C$_m$H$_{2m+1}$ where m=1 to 12,
as component (b) at least one copolymerizable, ethylenically unsaturated, organic compound which is different from (a)
and as component (c) at least one copolymerizable, ethylenically unsaturated, aromatic or partially aromatic ketone which is capable of abstracting hydrogen in the state where its triplet is excited.

Examples of compounds suitable as component (a) are the esters of acrylic acid and methacrylic acid with aliphatic, cycloaliphatic, araliphatic and aromatic alcohols having from 1 to 20 carbon atoms, for example methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, isoamyl (meth)acrylate, hexyl (meth)acrylate, 2-ethylhexyl (meth)acrylate, decyl (meth)acrylate, undecyl (meth)acrylate, dodecyl (meth)acrylate, tridecyl (meth)acrylate, cyclohexyl (meth)acrylate, methylcyclohexyl (meth)acrylate, benzyl (meth)acrylate, tetrahydrofurfuryl (meth)acrylate, furfuryl (meth)acrylate and the esters of 3-phenylacrylic acid and their various isomeric forms, for example methyl cinnamate, ethyl cinnamate, butyl cinnamate, benzyl cinnamate, cyclohexyl cinnamate, isoamyl cinnamate, tetrahydrofurfuryl cinnamate and furfuryl cinnamate and also acrylamide, methacrylamide, methylolacrylamide, methylolmethacrylamide, acrylic acid, methacrylic acid, 3-phenylacrylic acid, hydroxyalkyl (meth)acrylates, such as ethylglycol mono(meth)acrylate, butylglycol mono(meth)acrylate, hexanediol mono(meth)acrylate, glycol ether (meth)acrylates such as methoxyethylglycol mono(meth)acrylate, ethyloxyethylglycol mono(meth)acrylate, butyloxyethylglycol mono(meth)acrylate, phenyloxyethylglycol mono(meth)acrylate, glycidyl acrylate, glycidyl methacrylate, and amino (meth)acrylates such as 2-aminoethyl (meth)acrylate.

Monomers (a) which may carry other functional groups apart from the double bond may be used for an additional, thermally activatable crosslinking reaction, and in this case are present in proportions of from 10 to 40% of the monomers (a). Generally, however, they are employed in minor amounts in which they improve, for example, the adhesion, electrostatic chargeability, flow properties of the powders and surface smoothness. Furthermore, derivatives of 3-phenylacrylic acid as intrinsic stabilizers improve the weather resistance of the coatings.

Component (a) is incorporated by polymerization into the copolymer to be employed in accordance with the invention, in general, in quantities of from 20 to 80% by weight, preferably from 40 to 60% by weight, based on the total quantity of components (a)+(b)+(c). Examples of monomers suitable as component (b) are those which can be polymerized by a free-radical method, especially those which are able to undergo free-radical copolymerization with component (a), such as styrene, 1-methylstyrene, 4-tert-butylstyrene, 2-chlorostyrene, vinyl esters of fatty acids having from 2 to 20 carbon atoms, such as vinyl acetate, vinyl propionate, vinyl ethers of alkanols having from 2 to 20 carbon atoms, such as vinyl isobutyl ether, and also vinyl chloride, vinylidene chloride, vinyl alkyl ketones, dienes such as butadiene and isoprene, and esters of maleic and crotonic acid. Other suitable monomers (b) are cyclic vinyl compounds, such as vinylpyridine and vinylpyrrolidone. Monomers containing allylic unsaturation can also be employed, examples being allyl alcohol, allylalkyl esters, monoallyl phthalate and allyl phthalate. Other suitable monomers are acrolein, methacrolein and polymerizable isocyanates.

Component (b) is incorporated by polymerization into the copolymer to be employed in accordance with the invention, in general, in quantities of from 5 to 40% by weight, preferably from 20 to 40% by weight, based on the overall quantity of components (a)+(b)+(c). Particular importance is attached to components (monomers) (a) or (b) which carry hydrogen atoms which can be abstracted with particular ease, especially monomers containing isoalkyl, cycloisoalkyl, cycloalkyl, furfuryl and tetrahydrofurfuryl radicals. Such monomers can be used to increase the photosensitivity of the coating materials according to the invention.

Component (c) comprises copolymerizable, ethylenically unsaturated, aromatic or partially aromatic ketones which are capable of abstracting hydrogen in the excited triplet state. Particularly useful substances are those having the following structural formulae:

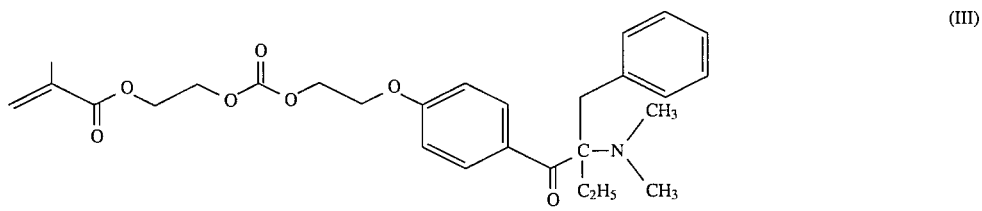

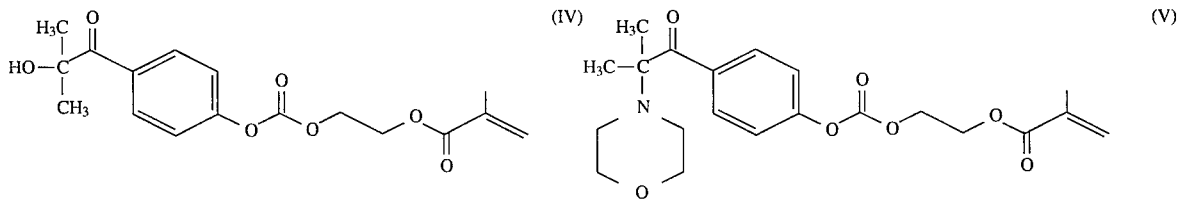

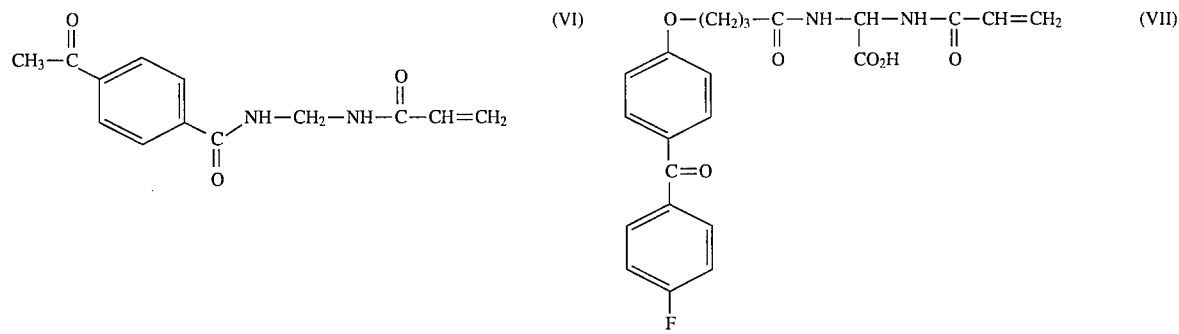

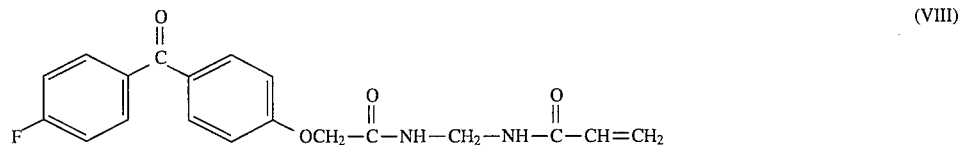

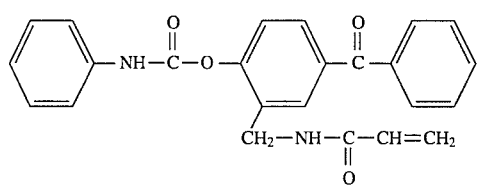 (IX)
-continued
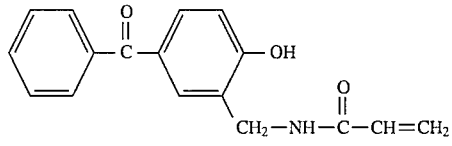 (X)
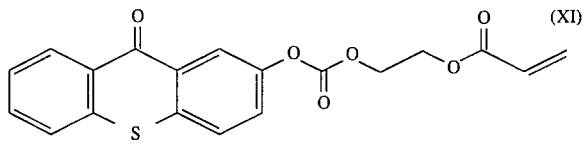 (XI)
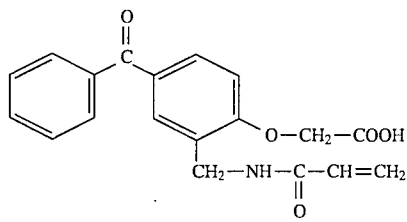 (XII)
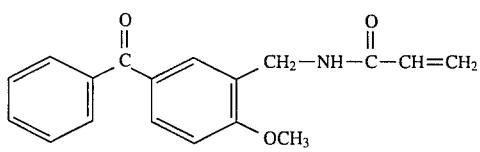 (XIII)
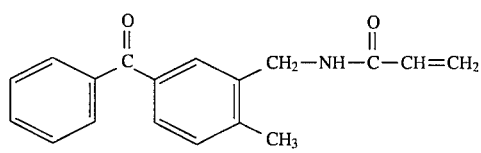 (XIV)
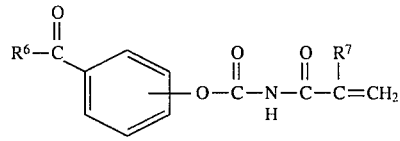 (XV)
in which
$R^6$ is —CH$_3$ or —C$_6$H$_5$ and
$R^7$ is —H or —CH$_3$,
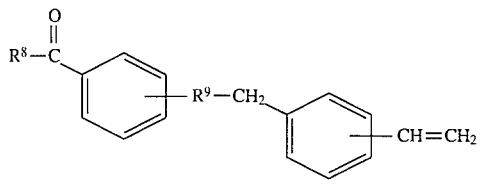 (XVI)
in which
$R^8$ is —C$_n$C$_{2n+1}$ where n=1 to 3 or is —C$_6$H$_5$
$R^9$ —O—
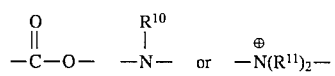
$R^{10}$ is —H or —C$_n$H$_{2n+1}$ where n=1 to 8 and
$R^{11}$ is —C$_n$H$_{2n+1}$ where n=1 to 4

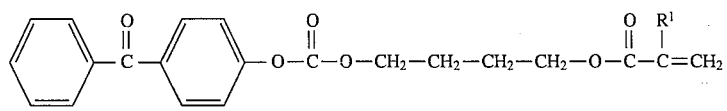 (XVII)
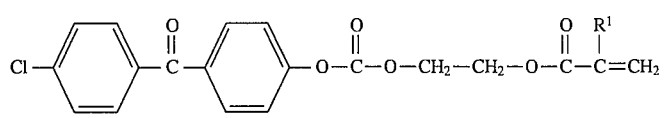 (XVIII)
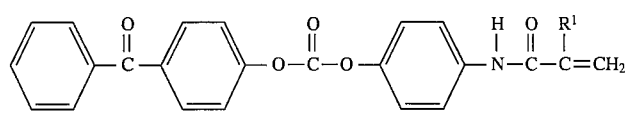 (XIX)
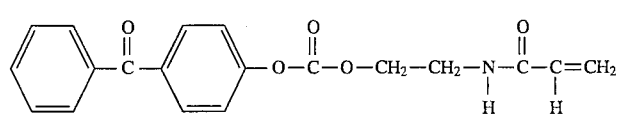 (XX)
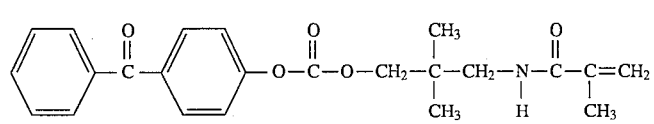 (XXI)
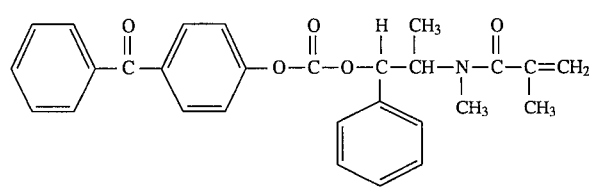 (XXII)
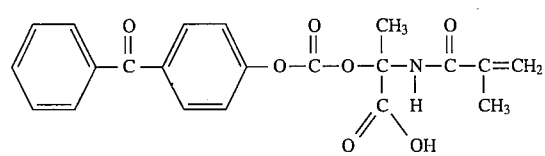 (XXIII)
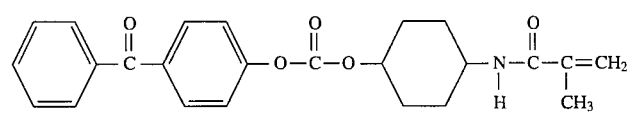 (XXIV)
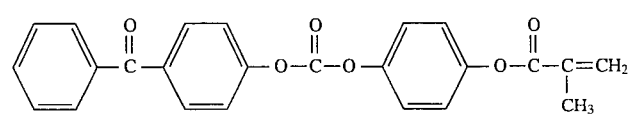 (XXV)
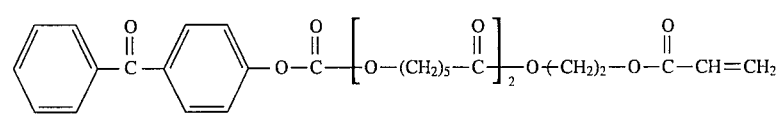 (XXVI)
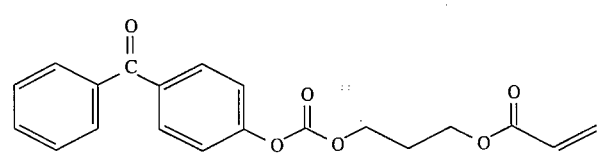 (XXVII)
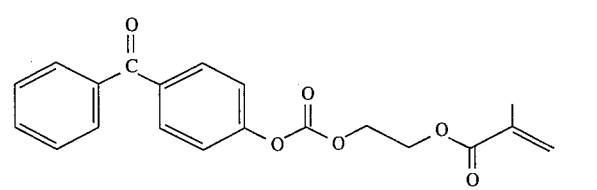 (XXVIII)

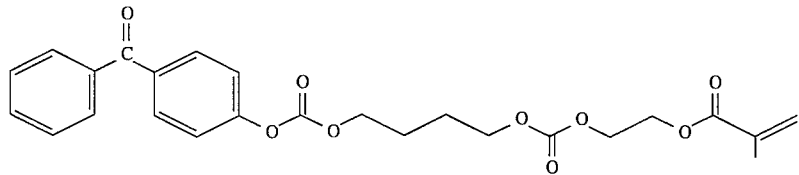 (XXIX)
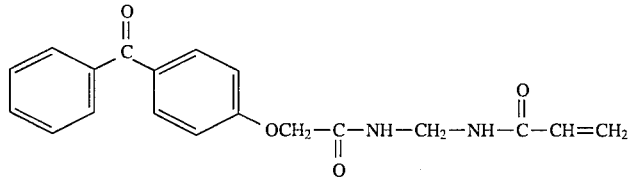 (XXX)
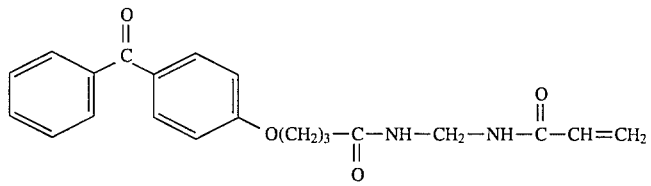 (XXXI)
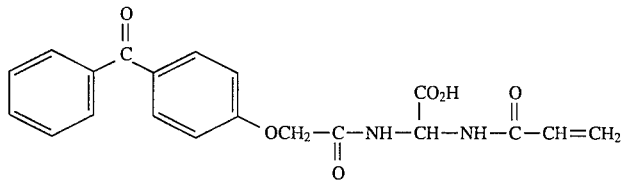 (XXXII)
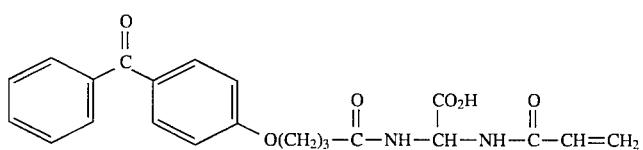 (XXXIII)
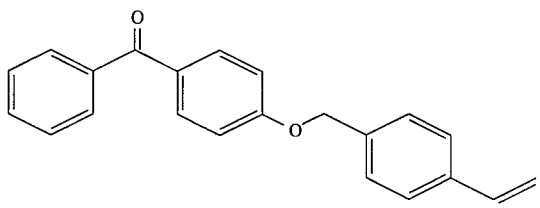 (XXXIV)
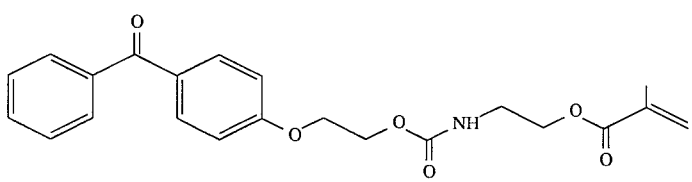 (XXXV)
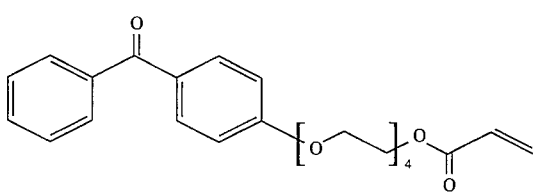 (XXXVI)
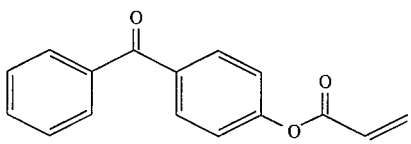 (XXXVII)

-continued

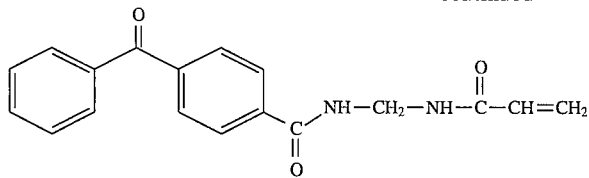 (XXXVIII)

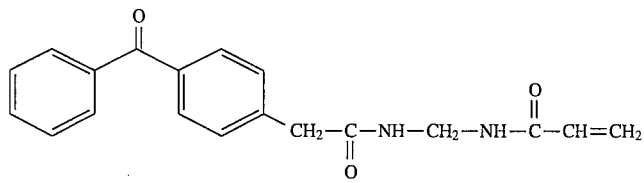 (XXXIX)

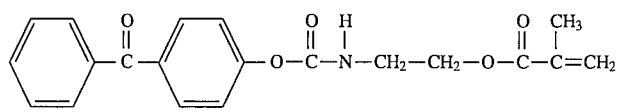 (XL)

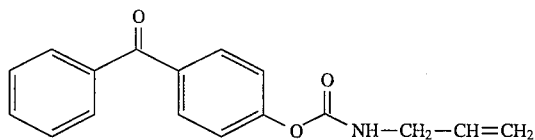 (XLI)

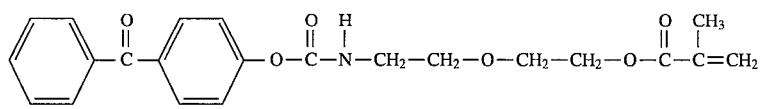 (XLII)

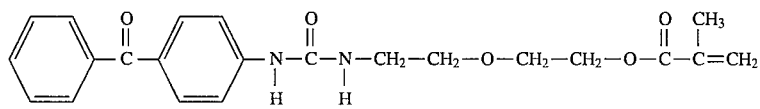 (XLIII)

Preferred components (c) are those derived from benzophenone, especially those in which the ethylenically unsaturated group is separated from the benzophenone group by a molecular spacer, ie. in the form ketone group . . . spacer . . . ethylenically unsaturated group.

Examples of such particularly preferred components (c) are those indicated by the above structural formulae (VIII), (XVII), (XX), (XXI), (XXII), (XXIII), (XXIV), (XXV), (XXVI), (XXVII), (XXVIII), (XXXIX), (XL), (XLII) and (XLIII).

Component (c) is incorporated by polymerization into the copolymer to be used in accordance with the invention in quantities of from 10 to 50% by weight, preferably from 20 to 40% by weight, based on the overall quantity of components (a)+(b) +(c).

The selection of the combination of monomers (a) to (c) is advantageously such that the powder coatings having good stability on storage, ie. are especially blocking-resistant and remain capable of application, ie. retain good electrostatic spraying properties, and so that the coatings cured by UV light meet the requirements placed on them. These requirements may be very different; for instance, clear topcoats of metallic automotive finishes are required to have a very high degree of yellowing resistance and weather resistance, scratch resistance and gloss retention coupled with a high degree of hardness. For a coil coating material, ie. one which is applied to sheet-metal webs which are then coiled and later on subjected to a deformation process, the critical factors are maximum elasticity and adhesion. The price of the monomers may be another selection criterion for specific applications in which a low price is a higher priority than the quality of the coatings.

It is known that styrene and methyl methacrylate are hard monomers which increase the glass transition temperature and the softening point of the polymers and the hardness of the coatings, whereas butyl acrylate, ethylhexyl acrylate and tridecyl acrylate are soft monomers which lessen these properties but bring about an improvement in elasticity. It is also known that minor proportions of (meth)acrylic acid or (meth)acrylamide improve adhesion.

These basic principles governing the selection and mixing of monomers in order to influence the properties of coating materials are known to polymer chemists and coating technologists.

For reasons of cost the proportion of component (c) is kept as low as possible; however, since it has a direct effect on the crosslinking density, it is advantageous to carry out experiments to determine the optimum proportion which is appropriate to the intended application.

Whereas the monomers (c) are included in the monomer mixture to achieve crosslinking by hydrogen abstraction, these mixtures may also contain co-crosslinking components for the UV crosslinking of double bonds. These double bonds can be introduced into the polymers, for example, by reacting (meth)acrylic acid, which has been incorporated by polymerization, with glycidyl methacrylate, or vice versa, or preferably by reacting hydroxyalkyl (meth)acrylares, which have been incorporated by polymerization, with acrylic anhydride or methacrylic anhydride.

The polymers can be prepared conventionally by free-radical solution or bulk polymerization, initiated by thermal and/or freeradical initiators.

A particularly suitable process is high-temperature bulk polymerization in continuous reactors, since it leads to products having a low molecular weight and a narrow molecular weight distribution and also does away with the need to remove an auxiliary solvent. It is also possible to produce ready-to-use powder coatings in a single process, by incorporating auxiliaries, pigments and other substances into the ready-to-use powder coating formulations in the discharge apparatus of the reactor or in an extruder attached immediately downstream of this reactor.

The polymerization technique is not a subject of the present invention.

For optimum film formation from the powders at relatively low temperatures it is desirable to use polymers having a relatively low molecular weight and a narrow molecular weight distribution.

Highly suitable polymers from the point of view of an optimum film surface are those having a number-average molecular weight $\overline{M}_n$ of from 1000 to 20,000, preferably from 1500 to 8000, and in particular from to 1500 to 6000.

A further factor is the molecular weight distribution, ie. the quotient of the number-average ($\overline{M}_n$) and the weight-average ($\overline{M}_w$) molecular weight, which for optimum flow should be below 4.

It is possible to deviate from the guide values indicated above in order to meet specific performance requirements, for example, high stability on vertical surfaces.

Powder coating materials can be produced from the polymers of the invention by prior art methods as described in, for example, "Powder Coatings, Chemistry and Technology" Toskn Aleksandar Miser, John Wiley and Sons, Chichester (1991).

Other components of the monomer mixtures may be present in order to enable thermally initiated co-crosslinking as a complement to crosslinking by UV light. Examples of suitable components in this context are glycidyl methacrylate, which may react with external crosslinking agents such as polyfunctional carboxylic acids or carboxylic acid anhydrides, or free carboxyl groups derived from (meth)acrylic acid incorporated by polymerization, which can be crosslinked using polyepoxy resins. The incorporation by polymerization of methylolation products and of methylol ethers of (meth)acrylamide is also suitable for achieving thermal co-crosslinking.

In addition, crosslinking may also involve a known mechanism which is not novel and is independent of the mechanism of direct hydrogen abstraction in accordance with the invention. These suitable, known mechanisms include both photoactivated and thermally activated mechanisms. The purpose of this is to produce comprehensive and extensive networks which give rise to improved coatings properties. For example, resins which carry double bonds and are not part of the invention can be added to the copolymers of the invention in order to achieve co-crosslinking by way of double bonds. Such resins can be obtained, for example, according to U.S. Pat. No. 4,046,161 or DE-A-24,36,186, based on polymers which contain glycidyl methacrylate and are reacted with acrylic acid. Coating materials which are not part of the invention, carrying copolymerized epoxide groups and having the capacity to be crosslinked with polycarboxylic acids, can be added to the coating materials of the invention.

In general the crosslinking action of component (c) is sufficient for good crosslinking under UV light. The molecular structure of these substances means that they are capable of absorbing UV light, making the transition to a state in which their triplets are excited, and bringing about crosslinking by hydrogen abstraction. However, to optimize the UV crosslinking and to adapt the formulations to the spectrum of the available UV source, it is also possible to use conventional UV absorbers and photoinitiators, such as benzoin ethers, benzophenone compounds, benzoin-phosphine oxides and thioxanthones.

The powder coatings may also contain conventional, prior art auxiliaries, examples being catalysts for co-crosslinking, flow improvers, anticrater agents, adhesion promoters, etc.

In the examples parts and percentages are by weight unless otherwise stated.

EXAMPLE 1

400 g of isobutanol were placed in a 2 liter flask fitted with inlet funnel, thermometer, reflux condenser and stirrer which was flushed with a gentle stream of nitrogen, and were heated to reflux, after which stirring at about 105°–108° C. was accompanied by the addition, at a constant rate over the course of one hour, of a mixture of 570 g of methyl methacrylate 200 g of styrene 50 g of 2-ethylhexyl acrylate 30 g of acrylic acid, 150 g of the compound of the structural formula (XVII) with $R^1$=H and 30 g of tert-butyl peroctanoate.

20 minutes after the end of the addition a further 10 g of tert-butyl peroctanoate were added dropwise over the course of 15 minutes, after which polymerization was continued at 105°–108° C. for 3 hours before the batch was cooled.

The majority of the solvent was removed by distillation under gentle vacuum from the viscous resin solution formed. The resulting resin melt, which contained residual solvent, was then poured out into porcelain dishes lined with aluminum foil and dried in a vacuum drying cabinet at 80° C. for 48 hours.

The result was a hard, brittle resin most of which was removed from the foils by tapping them and ground in a laboratory mill whose grinding mechanism comprised cutting blades. The coarse fractions were removed using a screen with a mesh size of 100 μm.

The resin was characterized, as a 1% strength solution in ethyl acetate, by its viscosity number: 15.2 cm³/g, and its K value: 23 (according to Fikentscher)

EXAMPLE 2

The procedure of Example 1 was repeated but using butyl acetate as solvent and reducing the quantity of tert-butyl peroctanoate in the 1st feed to 10 g in order to achieve a higher molecular weight.

The resin, as a 1% strength solution in ethyl acetate, was characterized by its viscosity number: 21.1 cm³/g, and its K value: 27.7

EXAMPLE 3

Example 1 was repeated but with the monomer composition below:

520 g of methyl methacrylate 150 g of styrene 50 g of 2-ethylhexyl acrylate 30 g of acrylic acid 250 g of the compound of the structural formula (XVII) with $R^1$=H.

The resin, as a 1% strength solution in ethyl acetate, was characterized by its viscosity number: 10.3 cm³/g, and its K value: 18.2

EXAMPLE 4 (WITH THERMAL CO-CROSSLINKING)

Example 1 was repeated but with the monomer composition below:

530 g of methyl methacrylate 150 g of styrene 70 g of 2-ethylhexyl acrylate 150 g of the compound of the structural formula (XVII) with $R^1$=H and 100 g of glycidyl methacrylate (0.705 mol).

A resin sample was dried in vacuo and, as a 1% strength solution in ethyl acetate, was characterized by its viscosity number:14.4 cm³/g, and its K value: 22.3

After polymerization, 51.5 g of adipic acid (0.36 mol) were dissolved in the resin solution at room temperature with stirring.

The resulting solution was then poured out into porcelain dishes lined with aluminum foil, and dried at 40° C. for 24 hours in a vacuum drying cabinet and then for a further 48 hours at room temperature. The hard, brittle residue was then detached from the aluminum foils and ground to a powder as described in Example 1. To remove the residual solvent the powder was subjected to further drying in a vacuum cabinet at room temperature for 48 hours more.

EXAMPLE 5

(with UV co-crosslinking by added polymer containing acrylic double bonds)

To prepare an acrylic resin containing free acrylic double bonds the procedure of DE-A-24,36,186, Example 4 was followed. For this purpose Example 1 of the present invention was repeated, to prepare a copolymer, but using the monomer composition below:

530 g of methyl methacrylate 150 g of styrene 70 g of 2-ethylhexyl acrylate 250 g of glycidyl methacrylate (1.76 mol)

A resin sample was dried in vacuo and, as a 1% strength solution in ethyl acetate, was characterized by its viscosity number:20.8 cm³/g, and its K value: 26.3

After polymerization, the following compounds were added to the resin solution at room temperature with stirring:

126.7 g of acrylic acid (1.76 mol)

0.5g of phenothiazine 1.0g of dimethylaminopyridine.

The acrylic acid was reacted with the glycidyl methacrylate, incorporated by polymerization, at 80° C. with stirring. The reaction was monitored by titrimetric determination of the free acid remaining. After 4 hours the acid number had fallen to 1.53. The batch was cooled to room temperature and was mixed at room temperature with an equal amount by weight of a polymer according to Example 1, in a dark brown bottle on a roller frame.

EXAMPLE 5/1

(Co-crosslinking via double bonds without addition of photoinitiator)

Half of the resulting polymer mixture was then processed to give a powder coating as described in Example 1, the materials being handled in a UV-screened fume cupboard.

EXAMPLE 5/2

(Co-crosslinking via double bonds with additional incorporation of photoinitiator)

The other half of the polymer mixture obtained was mixed with 3% of 2,4,6-trimethylbenzoyldiphenylphosphine oxide (Lucirin® TPO from BASF), based on the content of solid resin, and then processed to give a powder coating material as described in Example 1, the materials being handled in a UV-screened fume cupboard.

EXAMPLE 6

Coating resin obtained by high-temperature polymerization in a pressurized reactor Using relatively high quantities of tertbutyl peroctanoate, the resin having a lower molecular weight and narrower molecular weight distribution than in Example 1:

150 g of isopropanol were placed in a pressurized 2 liter reactor and heated to 180° C., after which the following mixture was then metered in at this temperature with stirring, at a constant rate over the course of one hour:

570 g of methyl methacrylate 200 g of styrene 50 g of 2-ethylhexyl acrylate 30 g of acrylic acid 150 g of the compound of the structural formula (XVII) with $R^1$=H and 60 g of di-tert-butyl peroxide The resin, as a 1% strength solution in ethyl acetate, was characterized by its viscosity number 10.3 cm³/g and its K value: 18.2

20 minutes after the end of the addition a solution of 10 g of di-tert-butyl peroctanoate in 50 g of isopropanol was run in, and polymerization was continued for 30 minutes.

The batch was then cooled to 80° C. and the resulting polymer was expressed, using nitrogen, through the bottom valve onto pieces of aluminum foil. The composition cools to form a tacky, solid resin. The aluminum foil together with the resin was cut into sections of appropriate size which were dried in a vacuum drying cabinet at 60° C. for 48 hours. The resulting resin was hard and brittle, and most of it was removed from the foils by being tapped and was ground in a laboratory mill with a grinding mechanism comprising cutting blades. The coarse fractions were removed using a screen having a mesh size of 100 μm.

The polymer has, as determined by DSC, a glass transition temperature Tg of 53° C. and a softening point of 77° C. Its number average molecular weight is 3800.

As a 1% strength solution in ethyl acetate it was further characterized by its viscosity number 6.1 cm³/g and its K value: 13.1.

For testing, these powders were applied to a metal test panel using a doctor blade having a gap height of 200 µm, to give a loose, uniform layer of powder on the panel. These operations were carried out in a laboratory with normal fluorescent lighting comprising daylight fractions. The powders give clear solutions in isopropanol and acetone and are not crosslinked by the prevailing light. The panels were then placed on a hotplate which had been heated beforehand to 140° C. After 3 minutes the powders had coalesced to give a uniform, even resin layer. These melts could be stirred as viscous liquids using a small spatula. The hotplate was then placed under a doped, medium-pressure mercury lamp emitting a broad spectrum of UV light, with the test panels partially screened from the UV light. In all of the examples, after 20 seconds the melted resin in the exposed section had crosslinked to form a film which could no longer be stirred using a spatula. In the screened region the viscous, liquid resin melt was unchanged, except for Example 4 in which the screened region had gelled to a great extent, but was markedly less crosslinked than the exposed region.

After exposure, the test panels were removed from the hotplate and allowed to cool. After this, cotton wool pads wetted with isopropanol were placed on the exposed and on the screened areas of the panels for 5 minutes, with the following results:

|  | Unexposed region | Exposed region |
| --- | --- | --- |
| Example 1 | dissolved | slightly swollen |
| Example 2 | dissolved | slightly swollen |
| Example 3 | dissolved | not attacked |
| Example 4 | swollen to a thick gel | not attacked |
| Example 5/2 | dissolved | minimal swelling |
| Example 5/2 | dissolved | not attacked |
| Example 6 | dissolved | slightly swollen |

I claim:

1. A method of coating a substrate with a powder coating which comprises: applying the powder to the substrate; melting the powder and crosslinking the powder by UV radiation, wherein the powder consists essentially of a copolymer of (a) at least one monomer of the formula I $$CH_2=C(R^1)-CO-OR^2 \quad (I)$$

where
   $R^1$=H or $C_3$ and
   $R^2$=H, $C_nH_{2n+1}$ where n=from 1 to 30, or is an alicyclic, araliphatic or heterocyclic radical, hydroxylalkyl, alkoxyalkyl, glycidyl or aminoalkyl,
   or of the formula (II)

$$CH_2=C(R^1)-CO-NR^3R^4 \quad (II)$$

where $R^1$=H or $CH_3$ and
   where $R^3$ and $R^4$ may be identical to or different from one another and are H, $CH_2OH$, $C_nH_{2n+1}$ where n=1 to 30 or $CH_2OR^5$ where $R^5=C_mH_{2m+1}$ where m=1 to 12, (b) at least one copolymerizable, ethylenically unsaturated, organic compound which is different from (a) and (c) at least one copolymerizable, ethylenically unsaturated, aromatic ketone which abstracts hydrogen in the excited triplet state, wherein component (c) is incorporated by polymerization into the copolymer in an amount of from 10 to 50% by weight, based on the overall weight of components (a), (b) and (c).

2. The method of claim 1, wherein the copolymer has a glass transition temperature of from −10° C. to 140° C.

3. The method of claim 1, wherein component (a) of the copolymer is selected from the group consisting of alkyl acrylate or alkylmethacrylate having from 1 to 10 carbon atoms in the alkyl radical and mixtures thereof with glycidyl(meth)acrylate and/or (meth)acrylic acid.

4. The method of claim 1, wherein the copolymer is mixed with a solid, ethylenically unsaturated, monomeric, oligomeric or polymeric substance in a ratio of from 90:10 to 10:90 before the powder is applied to the substrate.

5. The method of claim 1, wherein component (b) is selected from the a group consisting of styrene, 4-tert-butylstyrene and 1-methylstyrene.

6. The method of claim 1, wherein component (c) is incorporated by polymerization into the copolymer in an amount of from 20 to 40% by weight, based on the overall weight of components (a), (b) and (c).

7. The method of claim 1, wherein the copolymer has been prepared by the method of thin-film polymerization or in the presence of a solvent followed by the removal of the solvent.

8. The method of claim 1, wherein the copolymer has been prepared in the presence of a solvent and a free-radical polymerization initiator and the solvent has been removed.

9. The method of claim 1, wherein component (c) is selected from the group consisting of formula (III) to (XLIII):

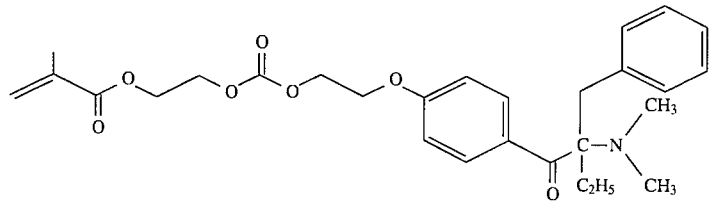

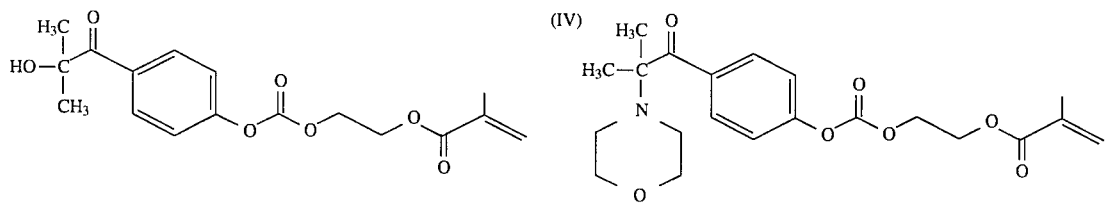

-continued
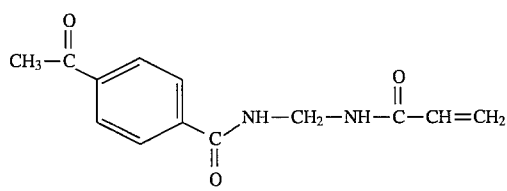
(VI)
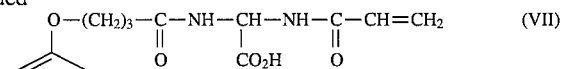
(VII)
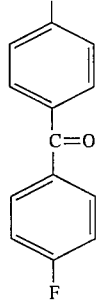
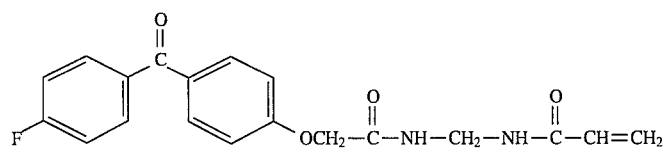
(VIII)
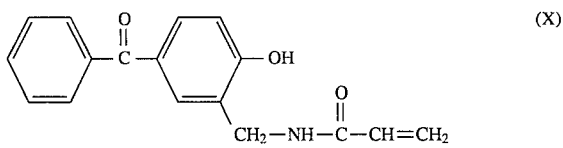
(IX)
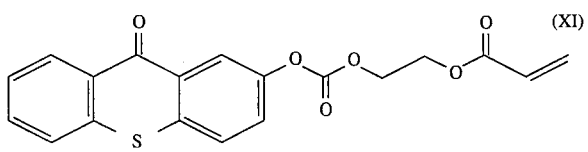
(X)
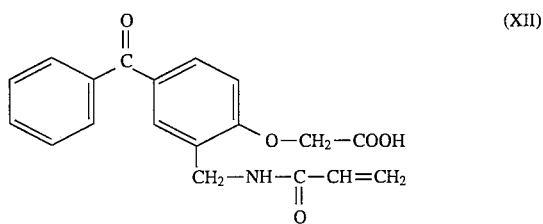
(XI)
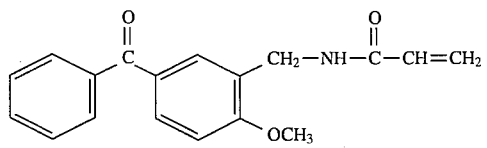
(XII)
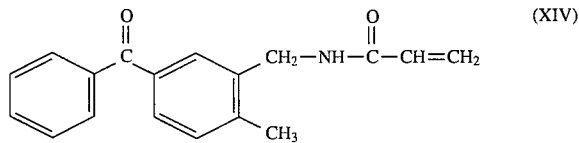
(XIII)
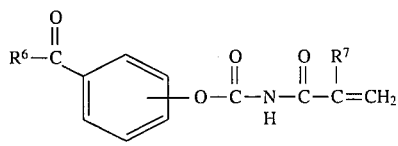
(XIV)
(XV)
in which
R$^6$ is —CH$_3$ or —C$_6$H$_5$ and
R$^7$ is —H or —CH$_3$,
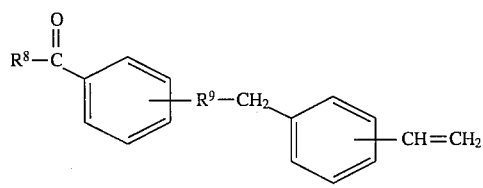
(XVI)
in which
R$^8$ is —C$_n$C$_{2n+1}$ where n=1 to 3 or is —C$_6$H$_5$
R$^9$ —O—
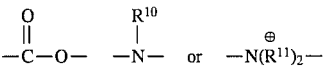
R$^{10}$ is —H or —C$_n$H$_{2n+1}$ where n=1 to 8 and
R$^{11}$ is —C$_n$H$_{2n+1}$ where n=1 to 4

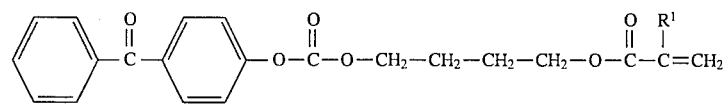 (XVII)
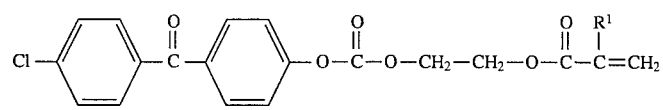 (XVIII)
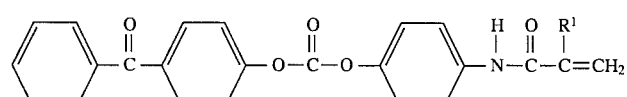 (XIX)
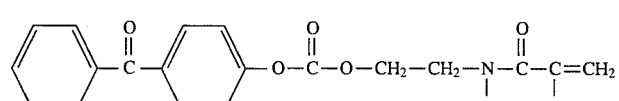 (XX)
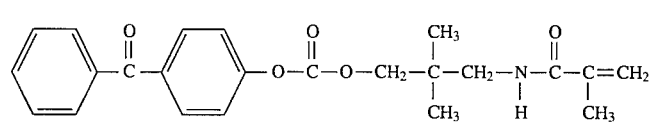 (XXI)
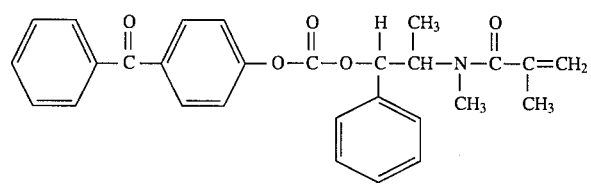 (XXII)
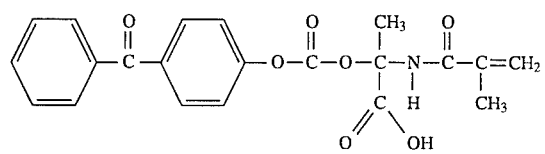 (XXIII)
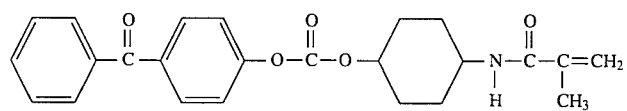 (XXIV)
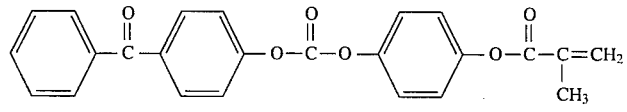 (XXV)
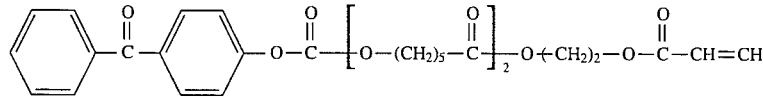 (XXVI)
 (XXVII)
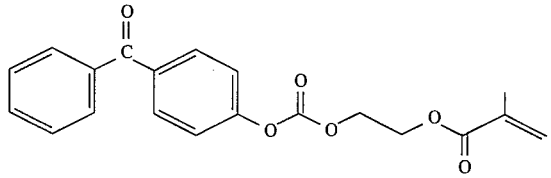 (XXVIII)

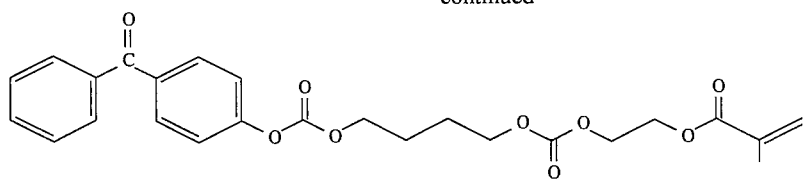
(XXIX)
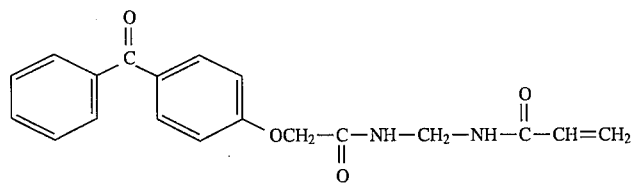
(XXX)
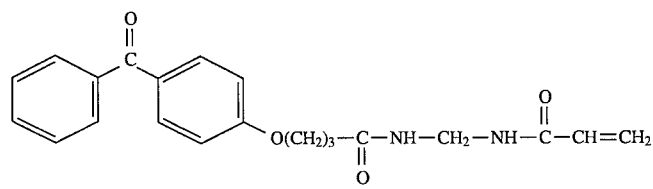
(XXXI)
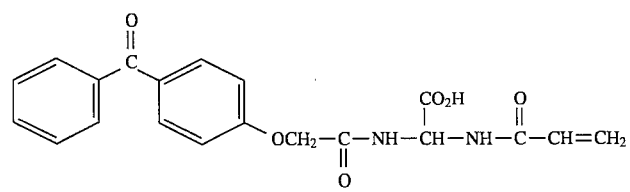
(XXXII)
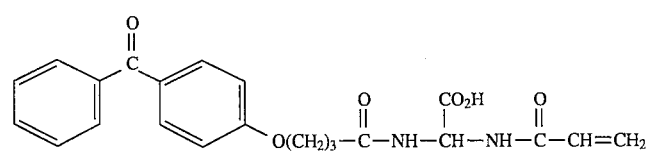
(XXXIII)
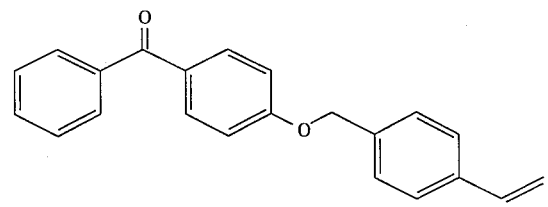
(XXXIV)
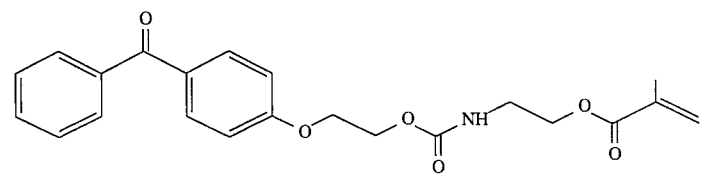
(XXXV)
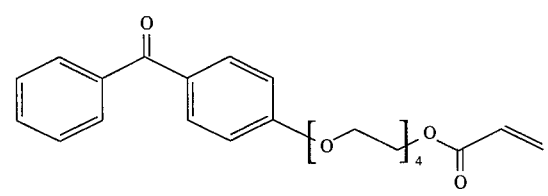
(XXXVI)
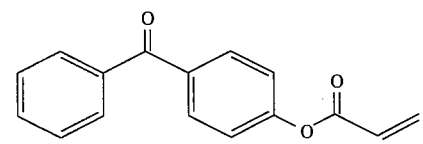
(XXXVII)

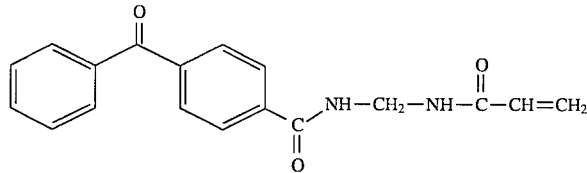 (XXXVIII)

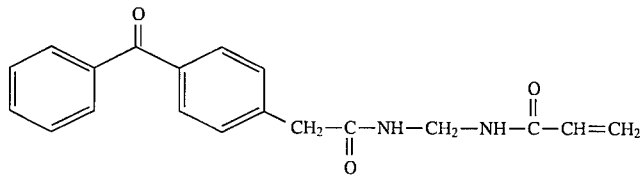 (XXXIX)

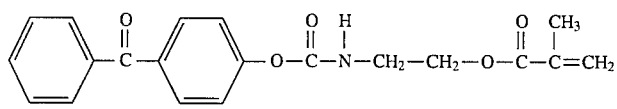 (XL)

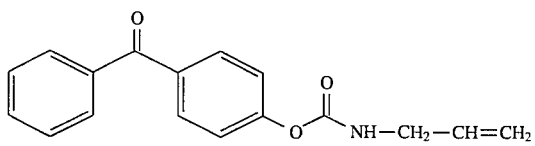 (XLI)

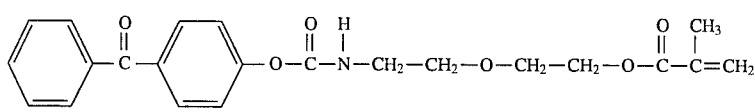 (XLII)

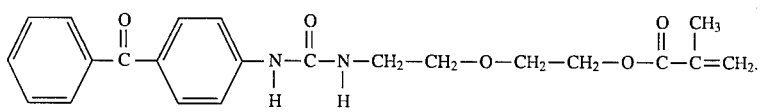 (XLIII)

10. The method of claim 1, wherein the powder coating is applied to the surface of the substrate to be coated by electrostatic spraying or fluidized-bed sintering, is melted on said surface by heating and, after having formed a coating which has flowed out but is still liquid, is crosslinked by UV radiation, or is crosslinked using UV beams after cooling.

11. The method of claim 1, wherein the copolymer contains C—C double bonds.

12. The method of claim 1, wherein the powder coating contains not only the UV photoinitiators (c) incorporated by polymerization but also additional UV photoinitiators.

13. The method of claim 1, wherein the powder coating additionally contains a UV stabilizer.

* * * * *

UNITED STATES PATENT AND TRADEMARK OFFICE
CERTIFICATE OF CORRECTION

PATENT NO.: 5,558,911

DATED: September 24, 1996

INVENTOR(S): Rainer BLUM

It is certified that error appears in the above-identified patent and that said Letters Patent is hereby corrected as shown below:

On the cover page, in the abstract, item [57], first line after formula (II), "$R^3$" should be --$R^1$--.

Column 19, claim 1, line 47, "$C_3$" should be --$CH_3$--.

Signed and Sealed this

Twenty-sixth Day of November 1996

Attest:

BRUCE LEHMAN

*Attesting Officer*   *Commissioner of Patents and Trademarks*